(12) United States Patent
Okamura

(10) Patent No.: US 6,611,732 B2
(45) Date of Patent: Aug. 26, 2003

(54) DISTRIBUTION SYSTEM

(75) Inventor: Eiji Okamura, Tokyo (JP)

(73) Assignee: Leading Information Technology Institute, Inc., Shinbashi (JP)

(*) Notice: Subject to any disclaimer, the term of this patent is extended or adjusted under 35 U.S.C. 154(b) by 48 days.

(21) Appl. No.: 09/746,847

(22) Filed: Dec. 21, 2000

(65) Prior Publication Data
US 2001/0027356 A1 Oct. 4, 2001

(30) Foreign Application Priority Data

| Dec. 22, 1999 | (JP) | 11-365285 |
| Jan. 31, 2000 | (JP) | 2000-021916 |
| Apr. 4, 2000 | (JP) | 2000-102483 |
| Jul. 19, 2000 | (JP) | 2000-219821 |
| Jul. 21, 2000 | (JP) | 2000-221299 |
| Sep. 5, 2000 | (JP) | 2000-268325 |

(51) Int. Cl.⁷ .................................................. G06F 7/00
(52) U.S. Cl. .................................. 700/226; 700/225
(58) Field of Search ............................... 700/225, 226; 705/28, 29

(56) References Cited

U.S. PATENT DOCUMENTS

| 5,038,283 A | * | 8/1991 | Caveney | 700/226 |
| 5,469,363 A | * | 11/1995 | Saliga | 700/225 |
| 5,712,789 A | * | 1/1998 | Radican | 700/226 |
| 5,768,140 A | * | 6/1998 | Swartz et al. | 700/225 |
| 6,118,379 A | * | 9/2000 | Kodukula et al. | 340/572.4 |
| 6,148,249 A | * | 11/2000 | Newman | 700/225 |
| 6,332,098 B2 | * | 12/2001 | Ross et al. | 700/226 |

FOREIGN PATENT DOCUMENTS

JP    8-73009    3/1996

OTHER PUBLICATIONS

JP 8–73009—English Language Abstract Mar. 1996.
Translation of JP 10–324405 in English.

* cited by examiner

Primary Examiner—Christopher P. Ellis
Assistant Examiner—Gene O. Crawford

(57) ABSTRACT

A distribution system in which many types of small-volume products classified according to product type, which includes clothing, accessories, shoes, bags, and wallets, design, color, and size are combined for shipping in one or more packing boxes to a retail store. Products 6 are packed in a package 2 at a shipping site 20 and shipped via a distribution network 4 to a receiving site 30. An electronic tag 1 containing data on a plurality of packed products 6 of differing type, color, and size is attached to each packing box, and the data stored on the electronic tag 1 is read at the receiving site 30 with a tag read device 32, stored in a database system 34, and printed on a printer 35.

8 Claims, 5 Drawing Sheets

DISTRIBUTION SYSTEM

CROSS REFERENCE TO RELATED APPLICATIONS

The following commonly assigned applications relating to various aspects of electronic tag technology that may be used in combination with the pesent invention are being filed concurrently herewith and are hereby incorporated in their entirety by reference:

1) Ser. No. 09/746,845, filed Dec. 21, 2000 entitled ELECTRONIC TAG DEVICE;
2) Ser. No. 09/746,844, filed Dec. 21, 2000 entitled INVENTORY CONTROL SYSTEM;
3) Ser. No. 09/746,846, filed Jun. 22, 2001 entitled DISTRIBUTION SYSTEM;
4) Ser. No. 09/746,849, filed Dec. 21, 2000 entitled ELECTRONIC TAG DEVICE; and
5) Ser. No. 09/746,848, filed Dec. 21, 2000 entitled PRODUCT INSPECTION DEVICE.

TECHNICAL FIELD

The invention generally relates to a distribution system for many types of products classified according to product type such as clothing, shoes, bags, and wallets as well as by the design, color, or size of each product type and, more specifically, relates to a distribution system in which small quantities of several such products may be delivered in the same package to a retail store or other customer facility.

PRIOR ART

The sale of miscellaneous goods such as fashion apparel and other clothing and accessories as well as shoes, bags, and wallets involves the display of a variety of types of products at retail stores. As products are specifically classified according to design, color, size, and other attributes, this requires the storage of the products as stored inventory in store storage space and promptly offering these products according to customer requests, which in turn necessitates the tasks of searching for and locating stored inventory.

However, retail stores must give priority to floor space utilized as an exhibit area for customers. Limits are placed on the area reserved for storage, and the arrangement and storage of in-stock products by type, design, color, size, and other attributes are notably difficult.

Moreover, jumps quickly take place from one group of hot-selling merchandise to the next in the areas of fashion clothing and miscellaneous goods. Even in-store stock moves frequently between production factory or long-term storage, which complicates inventory management.

Packaging such products by product type, design, color, and size when they are to be shipped increases the number of packages and brings a decrease in shipping efficiency.

As FIG. 6 shows, conventional distribution systems for the process of shipping and in-store storage of varying types of products for retail stores use a mixed packing method in which a plurality of products of differing types, designs, colors, and sizes are packed in one package and provide a package content list for each package that indicates in detail the products contained therein.

Such conventional distribution systems comprise a shipping site 20 and a receiving site 30. The shipping site 20 comprises a computer 21 that in turn comprises a printer and display 23 that prints a work order 24 showing the products to be packed for the order. The receiving site 30 comprises a database system 34 that electronically stores the details of package content and a computer 31 that comprises a display 33 and a printer 35 that prints a package content list 36. The computer 21 of the shipping site 20 and the computer 31 of the receiving site 30 are connected via a data transmission route 5. At the shipping site 20, the products to be shipped to the receiving site 30 are packed in the package 2 according to the work order 24, and once packing is complete, the package 2 is delivered to the receiving site 30 via a distribution network 4.

In this distribution system, package content data for the package 2 is prepared by the computer 21 of the shipping site 20 and transferred via the data transmission route 5 to the computer 31 of the receiving site 30, where it displayed on the display 33, printed as the package content list 36 by the printer 35, and electronically stored as inventory data in the database system 34.

In the distribution system shown in FIG. 6, the package 2 is shipped via the distribution network 4, and package content lists corresponding to mixed packages containing a plurality of products of differing types, designs, colors, and sizes are sent as the package content data of the package 2 via the data transmission route 5.

The problems of the distribution system shown in FIG. 6 are that either the generation of package content data for the package 2 is troublesome or the efficiency of packaging is low at the shipping site 20 and that disparities between inventory data and actual products in inventory arise, if only temporarily, because the time of arrival of the package 2 at the receiving site 30 and the time of arrival of the package content data at the receiving site 30 do not coincide.

When a plurality of products of differing types, designs, colors, and sizes are to be mixed and packed in a package, it is extremely difficult to determine the gross volume of the products that could be packed in a package of a certain volume prior to the start of packing because the volumes and shapes of the products differ.

Therefore, when many products are to be packaged and a plurality of packages are to be shipped to one receiving site 30, it is extremely difficult to include work instructions for a plurality of packages appear on the work order 24 at the shipping site 20.

Packing must proceed according to the following procedure: All work instructions for the products are listed on the work order 24 even when they are to be separated into a plurality of packages. A mark (a dashed line 25) indicating a division between the products packed is placed in the work order 24 during packing. Based on the work order 24 marked with the dashed line 25, a package content list for each package is input into the computer 21 and sent to the receiving site 30 via the data transmission route 5.

The items in the work order 24 could be listed in groupings constituting a range of products that could individually fit within the packages by calculating the volume of the products, but discrepancies between calculated values and package data would bring redundancy to the work, a number of products fewer than could be normally packed would have to be designated, and packing efficiency would necessarily decrease. If the designated number of products could not fit in the associated package, another content list would have to be prepared.

In other words, conventional distribution systems problematically require a new package content list to be prepared for every box.

Even when the package content list data of the package 2 arrives at the receiving site 30, the package content is displayed on the display 33 of the computer 31, the package content list 36 is printed on the printer 35, and the data is stored in the database system 34, this data remains invalid until the package 2 actually arrives at the receiving site 30, where it must be compared with valid data on actual product inventory. Once the package 2 does arrive, the data must be revised to valid data.

As has been discussed, the generation of detailed content data for each package 2 based on the actual packing records is necessitated at the shipping site 20 for mixed packages containing a plurality of products of differing types, designs, colors, sizes, and other attributes in a conventional distribution system. At the receiving site 30, this data must both be compared to valid data on actual product inventory and, when the package 2 arrives, be updated to valid data.

SUMMARY OF INVENTION

The distribution system of the invention, which ships products packed in a package 2 at a shipping site 20 via a distribution network 4 to a receiving site 30, sends in the package an electronic tag 1 containing data on the packaged products.

The products contained in the package 2 are of a plurality of types, and the data stored on the electronic tag 1 contains quantity information and specific data on the type, color, size, and other attributes of the packed products.

In the distribution system of the invention, the shipping site 20 comprises a display 23 that displays packing work for products to be packed in the package 2 and a tag write device 22 that writes data regarding the packed products on the electronic tag 1. The receiving site 30 comprises a tag read device 32 that reads the data stored on the electronic tag 1, a database system 34 that stores some or all of the data stored on the electronic tag 1, and a printer 35 that prints the data stored on the electronic tag 1.

Furthermore, in the distribution system according to the invention, either the shipping site 20 or the receiving site 30 may be the division that generates the forms to be attached to packages. In either case, the shipping site 20 has a collection and delivery function for mixing the collected products of differing types and packaging them according to the individual receiving site units.

DETAILED DESCRIPTION OF A PREFERRED EMBODIMENT OF THE INVENTION

Figure 1:
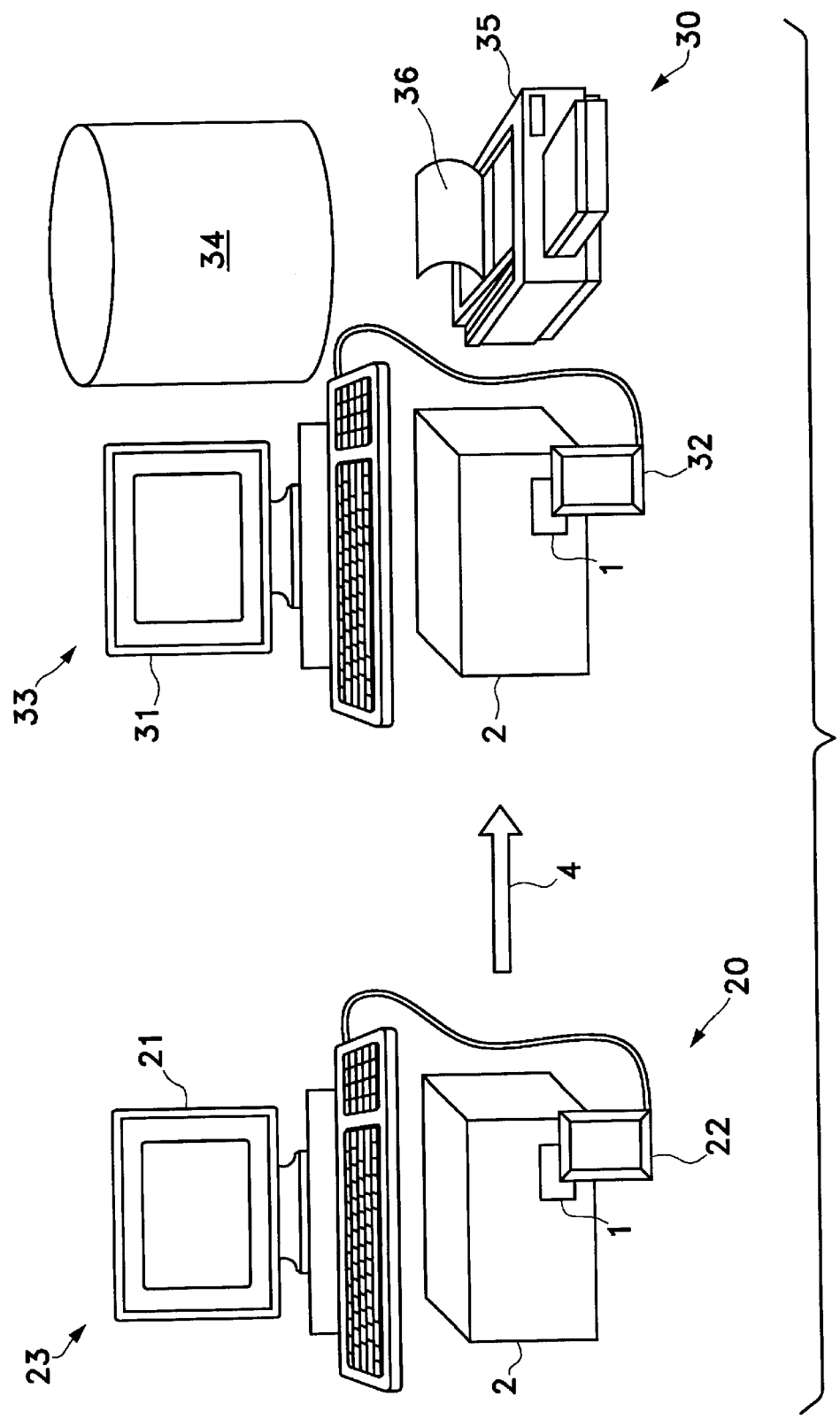
FIG. 1 is an overview of an embodiment of the distribution system of the invention.

As FIG. 1 shows, the distribution system of the invention comprises a shipping site 20 and a receiving site 30. The shipping site 20 comprises a computer 21 with a display 23 and a printer that prints a work order 24 indicating a product to be packaged according to an order and a tag read/write device 22 that reads and writes data from and to an electronic tag 1 attached to a package 2. The receiving site 30 comprises a computer 31 with a database system 34 that electronically stores details on package content, a display 33, a printer 35 that prints a package content list 36, and a tag read/write device 32 that reads and writes data from and to the electronic tag 1 attached to the package 2.

Figure 3:
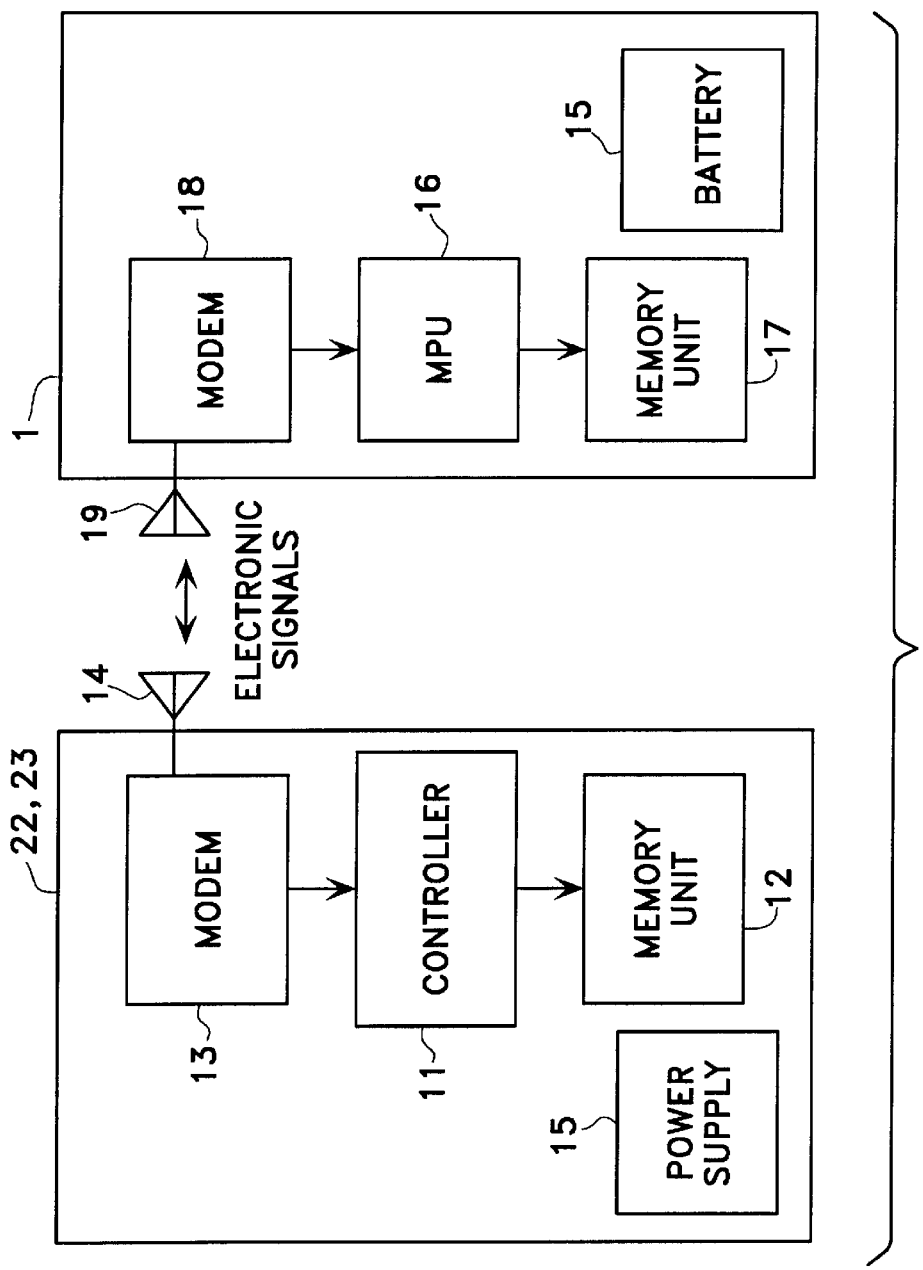
FIG. 3 is a block diagram showing the electronic tag and the tag read/write device used in the distribution system of the invention.

As shown in FIG. 3, the tag read/write devices 22 and 32 comprise a memory unit 12 and a modem 13 controlled by a controller 11, an antenna 14 connected to the modem 13, and a power supply 15. FIG. 3 also shows the electronic tag 1, which is a card-shaped, non-contact wireless tag comprising a memory unit 17 and a modem 18 controlled by an MPU 16, an antenna 19 connected to the modem 18, and a battery 15. The electronic tag 1 need not be a non-contact, wireless tag and may instead be a rewritable contact tag.

Figure 2:
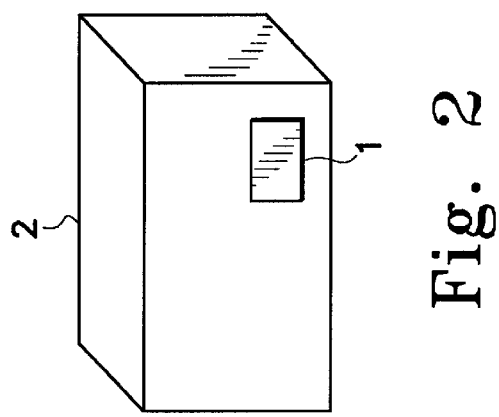
FIG. 2 is an external view showing the package to which the electronic tag used in the distribution system of the invention is attached.

The electronic tag 1—which comprises the high-capacity memory unit 17 whose content can be easily rewritten electronically—is lightweight and compact. As FIG. 2 shows, it may be attached to the outside of the package 2, which is used in general distribution, without being a hindrance. When the electronic tag 1 is of the non-contact, wireless variety, it can be placed within the package 2 to prevent accidents in which it rubs against something during shipping and is pulled from the box.

Figure 4:
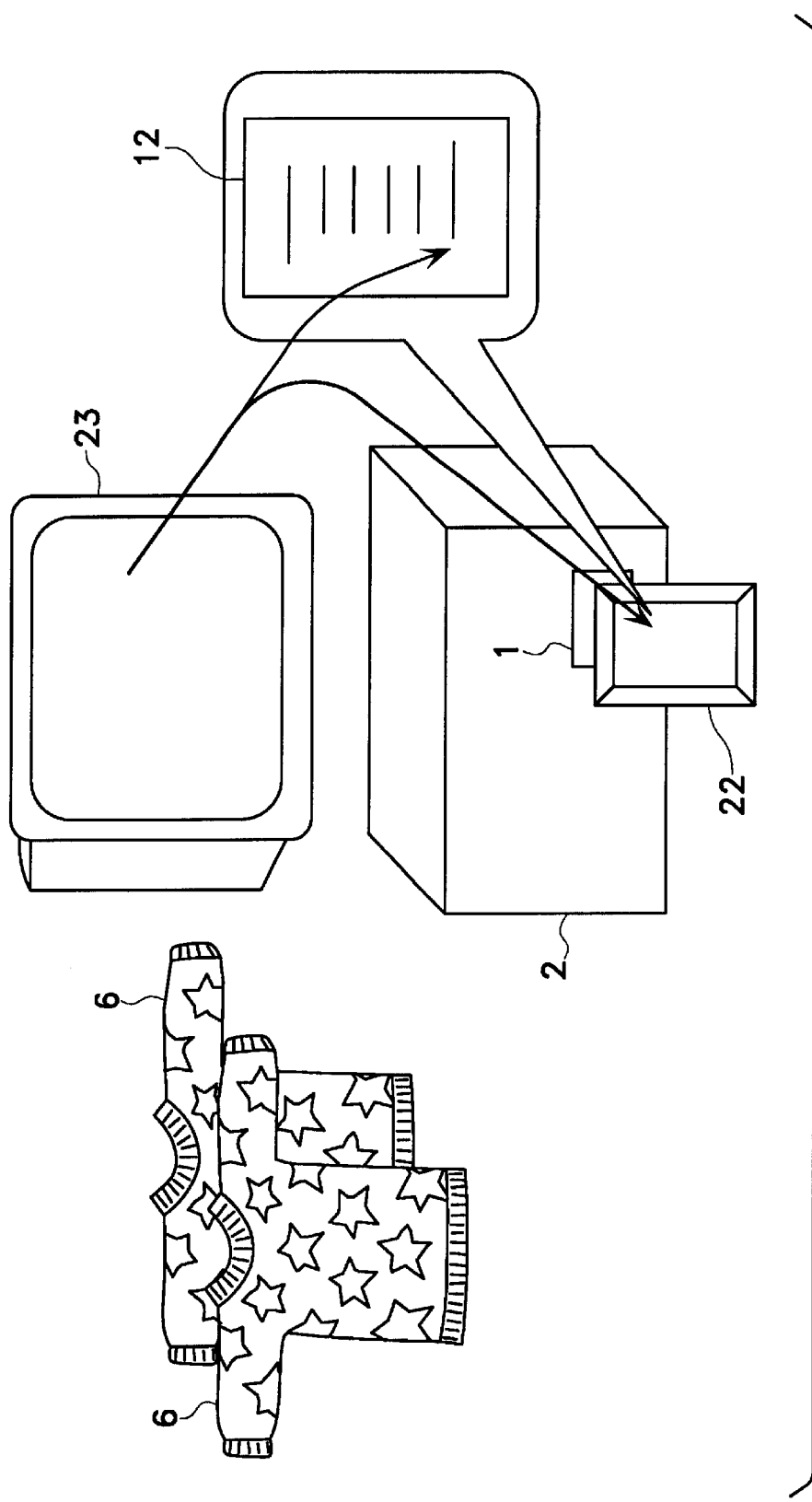
FIG. 4 illustrates shipping procedures at the shipping site of the distribution system of the invention.

As seen in FIG. 4, the number of products 6 to be sent to the receiving site 30 are packed into the package 2 according to the instructions shown on the display 23 of the computer 21 at the shipping site 20. Every time packaging is performed, required data on the products 6 is written onto the electronic tag 1, so the electronic tag 1 always contains the product numbers of the products packaged in the package 2 or the name and the quantity thereof. Data on color, size, and other attributes is also written for clothing, accessories, shoes, bags, wallets, etc.

When the package 2 becomes full and packing and packaging are complete, the package 2 to which the electronic tag 1 is attached is sent via the distribution network 4 to the receiving site 30. At this time, the package 2 to which the electronic tag 1 is attached leaves the proximity of the computer 21 and the tag read/write device 22, so no more data is written on the electronic tag 1, and the computer 21 writes work data (i.e., data on products to be packaged) onto the electronic tag 1 of new package 2.

In other words, the package 2 and the electronic tag 1 move simultaneously in the distribution system according to the invention, and the data on the electronic tag 1 is stored while the products 6 are being packed in the package 2 to which the electronic tag 1 is attached. Data is therefore automatically limited to the products 6 packed, and data stored on the electronic tag 1 attached to each package 2 is limited to that on the products 6 stored in the package 2 even when packing is performed on a plurality of packages 2 in succession.

Figure 5:
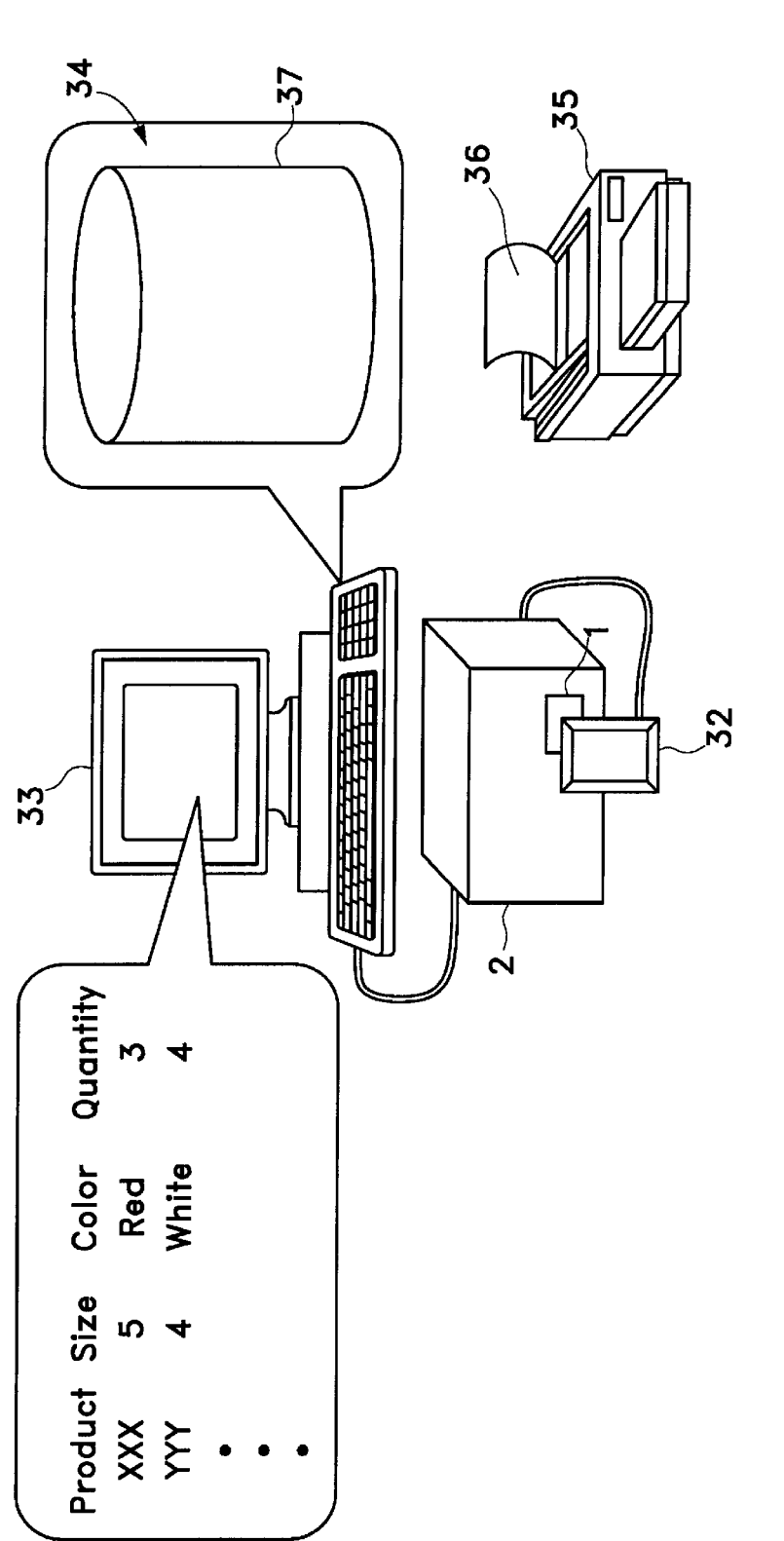
FIG. 5 illustrates receiving procedures at the receiving site of the distribution system of the invention.
Figure 6:
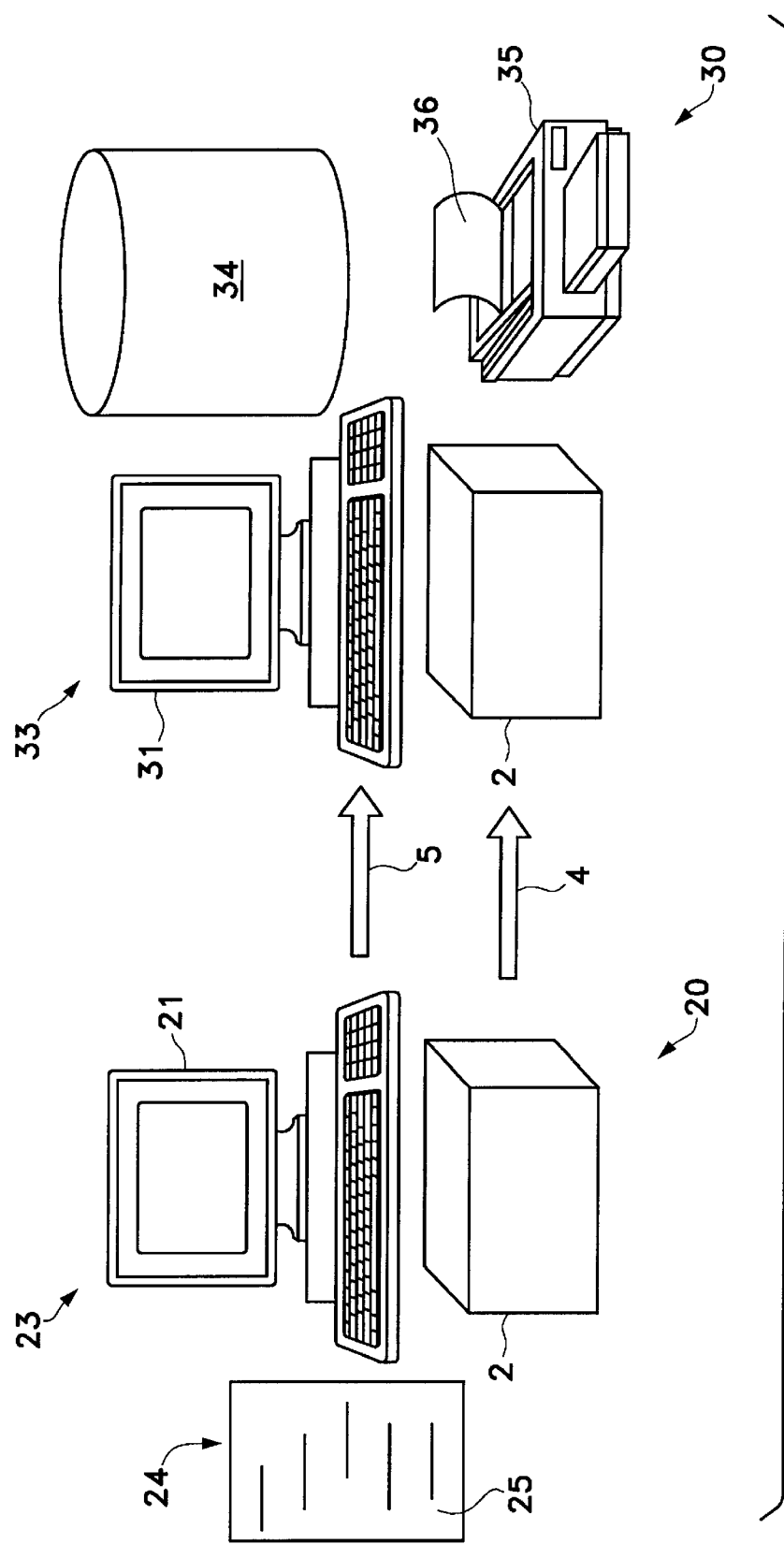
FIG. 6 is an overview of one example of a conventional distribution system.

As shown in FIG. 5, the computer 31, via the tag read/write device 32, reads data on the products 6 contained in the corresponding package 2 from the electronic tags 1 of the packages 2 arriving at the receiving site 30 via the distribution network 4. Data 37 in the database system 34 is updated, and the written data is displayed on the display 33 and printed out as a package content list 36 from the printer.

In the distribution system of the invention, the data on the products 6 contained in the packages 2 is provided without delay to the receiving site simultaneously with the arrival of the packages 2 at the receiving site 30.

As is clear from the above description of an embodiment of the inventions the distribution system of the invention, which packs a plurality of differing types of products in one package and sends data on the products contained in the package together with the package, brings about the effects discussed below.

(1) A transmission route for sending data on the packaged products is unnecessary.

(2) Divisions in product packing for each package 2 are automatically made to correspond to divisions in the data on the products written and stored on the electronic tags, so preparation of package content data based on differences between the actual packing records and packing instructions is unneeded. Furthermore, a quantity comprising a full package can be determined from the actual packing records, so steps adding redundancy to packing and thus reducing packing efficiency are eliminated.

(3) A package and its package content data arrive simultaneously at the receiving site, so the system is liberated from the task of confirming the validity of inventory information. Moreover, even if an accident were to prevent some of the packages from arriving at the receiving site, inventory information at the receiving site would not be put into disarray as a result.

Forms on which package content lists for the packages are written are normally prepared at the receiving site as one delivery task, but the distribution system of the invention allots form preparation to the division handling sorting at the shipping site, so forms can be attached to the packages

What is claimed is:

1. A distribution system in which a plurality of differing types of products of differing shapes and sizes are packed at a shipping site in one or more packages for transportation via a distribution channel to a receiving site comprising:

an electronic tag attached to each of said packages for storing product data concerning the products packed in that package;

means at the shipping site for displaying a work order specifying the plurality of products to be shipped to said receiving site, but not specifying which of said products are to be packed in a particular said package;

a tag writing device at the shipping site that writes said product data on the electronic tag attached to each said package as specific products on the work order are packed in that package;

a tag reading device at the receiving site that reads the product data stored on each said electronic tag; and a database system at the receiving site that stores some or all of the product data read by the tag reading device.

2. The distribution system according to claim 1, wherein the electronic tag is a non-contact, wireless tag.

3. The distribution system according to claim 1, wherein the data stored on the electronic tag comprises data and quantities for specifying the products to be packed in the package.

4. The distribution system according to claim 1, wherein the product to be packed includes at least one item from a group consisting of clothing, accessories, shoes, bags, and wallets.

5. The distribution system according to claim 1, wherein the data stored on the electronic tag contains at least one or both of the color and/or the size of the products to be packed.

6. The distribution system according to claim 1, wherein the receiving site comprises a printer that prints the data stored on the electronic tag.

7. The distribution system according to claim 1, wherein the shipping site comprises a collection and delivery function that mixes collected products of different types and packs them according to individual receiving site units.

8. The distribution system according to claim 1, wherein the receiving site is a store that sells the product.

* * * * *